United States Patent [19]

Takumi et al.

[11] Patent Number: 4,615,999
[45] Date of Patent: Oct. 7, 1986

[54] METHOD FOR PREPARING HYDRODESULFURIZATION CATALYST

[75] Inventors: Shizuo Takumi, Kamakura; Toshio Hashimoto; Masaru Tatsushima, both of Isehara, all of Japan

[73] Assignee: Nikki-Universal Co., Ltd., Tokyo, Japan

[21] Appl. No.: 762,974

[22] Filed: Aug. 6, 1985

[30] Foreign Application Priority Data

Dec. 11, 1984 [JP] Japan ................... 59-261629

[51] Int. Cl.$^4$ ................... B01J 21/04; B01J 23/85
[52] U.S. Cl. ................... 502/314; 208/216 R
[58] Field of Search ................... 502/314; 208/216 R, 208/216 PP

[56] References Cited

U.S. PATENT DOCUMENTS

| | | | |
|---|---|---|---|
| 3,935,127 | 1/1976 | Conway | 502/314 |
| 4,097,413 | 6/1978 | Simpson | 502/314 |

*Primary Examiner*—W. J. Shine
*Attorney, Agent, or Firm*—Flynn, Thiel, Boutell & Tanis

[57] ABSTRACT

This invention relates to a method for preparing a hydrodesulfurization catalyst which comprises (a) preparing a filter cake of amorphous alumina hydrate at a pH of 7.5–10.5; (b) dewatering the above prepared filter cake by a filter press to raise the $Al_2O_3$ concentration to 28–35% by weight and kneading the dewatered filter cake for at least 10 seconds by a self-cleaning type kneader; (c) kneading the dough obtained from the step (b) while adding respective aqueous solutions of water-soluble salts of Group VIB and Group VIII catalyst metals respectively in an amount of 20–60% by weight (as a metal amount) of the total metal amount used at the position just before the entrance of a kneader, kneading the resultant mixture and extruding the kneaded mixture by an extruder; (d) drying and calcining the extrudate; and (e) impregnating the calcined product with salts of remaining catalyst metals in an aqueous ammonia solution and drying and calcining the resultant product.

2 Claims, No Drawings

METHOD FOR PREPARING HYDRODESULFURIZATION CATALYST

BACKGROUND OF THE INVENTION

This invention relates to a method for preparing a hydrodesulfurization catalyst.

It is well known and has been practiced to carry out desulfurization by making sulfur-containing hydrocarbons and hydrogen come into contact with a catalyst comprising alumina having metals of VIB Group and VIII Group of the Periodic Table supported thereon under a pressure of 7-200 atm at a temperature of about 100°-450° C., thereby hydrogenating the sulfur compound but without hydrogenating the raw material fraction. Each conventional catalyst produces a good result in its own way, but various studies have been actively continued in order to develop a catalyst having a better activity and various proposals have been made with regard to hydrodesulfurization catalysts, usage thereof and methods of preparation thereof.

Prior to the present invention, Japanese Patent Publication No. 53-6113 (hereinafter referred to as "prior invention") discloses a unique method for preparing a hydrodesulfurization catalyst. That is, this method comprises (a) mixing powdery VIB Group and VIII Group metal compounds with refractory inorganic oxides to prepare an extrudable dough with a peptizer wherein the former two types of metal compounds are added in an amount corresponding to 60-90% by weight of the total amount of VIB Group and VIII Group metal compounds in the final catalyst product; (b) extruding the dough thus prepared and subjecting the extruded dough to drying and calcination; (c) impregnating the calcined extrudate with VIB Group and VIII Group metal compounds to form a final catalyst product containing 4-30% by weight (on the elementary basis) of VIB Group metal compound and 1-10% by weight (on the elementary basis) of VIII Group metal compound; and (d) subjecting the impregrated extrudate to drying and calcination in an oxidizing atmosphere to finally obtain a hydrodesulfurization catalyst. In short, according to the prior invention, catalyst metals are divided into two fractions. A larger amount of fraction is mixed with a catalyst carrier to form an extrudable dough and the remaining fraction is then added to the extrudate by impregnation. Although the cited reference discloses that the hydrodesulferization effect of this catalyst prepared by the above mentioned method is pretty good, but the result is not always satisfactory.

SUMMARY OF THE INVENTION

An object of the present invention is to provide a hydrodesulfurization catalyst efficiently effecting the above mentioned hydrodesulfurization of hydrocarbons and having a long life durability.

That is, the object of the present invention is to provide a method for preparing a hydrodesulfurization catalyst which comprises (a) preparing a filter cake of amorphous alumina hydrate at a pH of 7.5-10.5; (b) dewatering the above prepared filter cake by a filter press to raise the $Al_2O_3$ concentration to 28-35% by weight and kneading the dewatered filter cake for at least 10 seconds by a self-cleaning type kneader; (c) kneading the dough obtained from the step (b) with addition of respective aqueous solutions of water-soluble salts of Group VIB and Group VIII catalyst metals respectively in an amount of 20-60% by weight (as a metal amount) of the total metal amount used at the position just before the entrance of a kneader, kneading the resultant mixture and extruding the kneaded mixture by an extruder; (d) drying and calcining the extrudate; and (e) impregnating the calcined product with the remaining catalyst metals in an aqueous ammonia solution and drying and calcining the resultant product.

DETAILED EXPLANATION OF THE INVENTION

We filed Japanese Patent Application Laid No. 60-34733 (corresponding to U.S. Ser. No. 634,943 filed July 27, 1984) relating to a method for preparing an alumina catalyst carrier by freely controlling excellent physical properties. This method comprises washing an amorphous alumina hydrate prepared from aluminium sulfate and sodium aluminate as a starting material with a dilute aqueous ammonia, filtering the washed product, conditioning the filter cake at a pH of 7.5-10.5, dewatering the filter cake by a filter press to raise the $Al_2O_3$ concentration to 28-35% by weight and kneading the dewatered filter cake for at least 10 seconds by a self-cleaning type kneader, extruding the dough obtained from the preceding step, drying the extrudate and calcining the dried extrudate to prepare a catalyst carrier.

On the assumption that a hydrodesulfurization catalyst having a satisfactory desulfuring effect can be obtained without mixing a carrier with powdery catalyst metal in the presence of a peptizer as in the prior invention if a certain amount of catalyst metal is previously added to a carrier material in the process of preparation of the carrier and the mixture is kneaded and extruded, we have conceived the present invention as a result of the study that how much amount of the catalyst metal should be added in what stage of the process of preparation of the carrier.

Among Group VIB catalyst metals used in the present invention, Cr, Mo and W are all usable, but Mo is most common. Accordingly, the present invention is hereinafter illustrated with regard to Mo. In the same manner, among Group VIII catalyst metals, Co, Ni and Fe are usable, but the present invention is illustrated particularly with regard to Co and Ni in view of catalyst activity. Among these metals, Mo of Group VIB is used as a water soluble salt of molybdic acid such as ammonium molybdate, ammonium paramolybdate, ammonium dimolybdate and the like. Nickel is used as a water soluble compound such as nickel nitrate, nickel sulfate, nickel chloride, nickel acetate, nickel formate and the like. Cobalt is used as a water soluble compound such as cobalt nitrate, cobalt sulfate, cobalt chloride and the like. In view of easy handling and catalyst activity, molybdenum is used preferably in the form of an ammonium salt, and cobalt and nickel are used preferably in the form of nitrate.

The process for preparing a hydrodesulfurization catalyst of the present invention is more fully illustrated hereinafter step by step.

In the steps (a) and (b), before admixing catalyst metal salts such as ammonium molybdenate and cobalt nitrate with a carrier, a filter cake of amorphous alumina hydrate conditioned to a pH of 7.5-10.5 is dewatered to raise the $Al_2O_3$ concentration to 28-35% by weight by a filter press and the dewatered filter cake is kneaded in a self-cleaning type kneader for at least 10 seconds.

The kneading by this self-cleaning type kneader is an essential feature of the present invention, together with the addition procedure of the catalyst metal compounds. This kneading procedure is the indispensable step for growing pseudo-boehmite grain from amorphous alumina hydrate. It is necessary to carry out this kneading for at least 10 seconds. Generally, when the kneading time is longer, a pore volume and an average pore diameter of alumina carrier become larger. According to the present invention, the kneading is carried out for about 1 to 10 minutes since alumina carrier having a pore volume as large as possible is desired. The water content of a self-cleaning cake to be put into this self-cleaning type kneader is 65–72% by weight, that is, the amount of amorphous alumina being 28–35% by weight. The kneading is preferably carried out at an elevated temperature, but less than 100° C. If the kneading temperature exceeds 100° C., water is lost by evaporation, thus constituting a hindrance to the following extruding procedure. Generally, 2–4% by weight of water content is reduced during kneading even at a temperature less than 100° C.

In the step (c), the alumina mixture thus obtained is mixed with catalyst metals and the resultant mixture is extruded by an extruder.

Aqueous solutions of both metal salts are continuously added at the same time to the dough obtained as mentioned above (if possible, supplied from separate nozzles), and the resultant dough is extruded.

As mentioned above, the formation of a catalyst is simple. This is because the pore properties of alumina carrier are fixed by the kneading conditions in the self-cleaning type kneader. When aqueous solutions of catalyst metal compounds are added to the alumina carrier mixture having the fixed pore properties, the catalyst metal compounds are adhered satisfactorily to the inside of the pore of the carrier without any loss.

In the step (c), both catalyst metal compounds of VIB Group (for example, molybdenum) and VIII Group (for example, cobalt or nickel) are used respectively in an amount of 20–60% by weight, preferably 30–50% by weight of the total amount used. In this case, the ratio of molybdenum/cobalt or nickel may be arranged in such a manner as to correspond to that of both in the total amount, but this arrangement is not always necessary. Generally, molybdenum is preferably used in an amount of 3–4% by weight of the amount of the carrier and cobalt or nickel is used in an amount of 1–2% by weight on the same basis.

The molybdenum compound as the main catalyst metal, is generally added in an ammonium solution of $(NH_4)_6Mo_7O_{24}$—$4H_2O$, and the amount of ammonia is preferably fixed in such a manner as to provide the composition of $(NH_4)_2MoO_4$. Cobalt and nickel are usually used in an aqueous solution of nitrate. Since the above mentioned molybdenum compound or nitrates of cobalt, nickel and the like are fully dissolved in water, aqueous solutions of these compounds having high concentrations are added to the dough to be extruded. Thus, the water amount of the aqueous solution is very small in comparison with the water content of the dough, and therefore the water of the aqueous solution does not have an influence on the plasticity of the dough to be extruded.

The catalyst metal compounds are added in the forms of the aqueous solutions of ammonium molybdenate and cobalt nitrate or nickel nitrate at a constant ratio to the dough at the entrance of an extruder respectively from separate nozzles. These metal compounds should be added in such a constant speed as that the properties of the catalyst product can be maintained constant. The diameter of a die of an extruder is determined depending on the desired size of a catalyst, but generally about 2 mm.

In the step (d), the extrudate is dried at about 100° C., and the dried product is calcined at 250° C.–400° C. for 1 hour and further at about 600° C. for 1 to 3 hours.

In the step (e), the above calcined catalyst metal-containing carrier is dipped in an aqueous ammonium solution containing catalyst metal, thus the remaining amounts of catalyst metal compounds being adsorbed on the carrier by impregnation. This impregnation step is carried out by a usual method, for example by dipping the calcined carrier in an aqueous solution of an excess amount of catalyst metals.

The resultant catalyst impregnated with the metals are dried, in the same manner as in the preceding step, at about 100° C., and the dried product in calcined at 350° C. for 1 hour and further at about 600° C. for 1–2 hours. The size of the finally produced catalyst may optionally be selected depending on the use, but is usually 1.5–2 mm in diameter and 4–5 mm in length.

The catalyst of the present invention prepared as mentioned above has a large activity although the apparent specific gravity is low. The cited Japanese Patent Publication No. 53-6113 discloses that a catalyst prepared by incorporating catalyst metals by a combination procedure of co-extrusion and impregnation steps has a larger activity than a catalyst prepared by incorporating catalyst metals by an impregnation step only. However, the activity of the catalyst of the present invention prepared by incorporating catalyst metals into alumina carrier prepared by using a self-cleaning type kneader in accordance with a combination procedure of co-extrusion step using an aqueous solution of catalyst metals and impregnation step is moreover higher than that of the catalyst of the prior invention prepared by incorporating catalyst metals by the combination procedure of co-extrusion step using powdery catalyst metals and impregnation step. In addition to this advantage, according to the present invention, the catalyst is prepared substantially at the same time as the preparation of the carrier, thus the productivity being very high.

The catalyst of the present invention is used in desulfurization of petroleum fractions in the same manner as in conventional hydrodesulfurization catalysts. However, since the activity of the catalyst of the present invention is very high, it can be applied not only to petroleum fractions such as heavy fractions like vacuum distillation oil but also to high sulfur-containing petroleum fractions such as bottom oil of distillation. Thus, the catalyst of the present invention can be applied to various sulfur-containing petroleum fractions of wide range.

The present invention is further illustrated by the following Examples and Comparative Examples concerning preparation and usage, but should not be limited thereto.

EXAMPLE 1

A solution prepared by dissolving 61 g of ammonium paramolybdenate in 162 g of 4.2 wt % $NH_3$ solution and a solution prepared by dissolving 75 g of cobalt nitrate in 71 g of water were added to 2518 g of amorphous alumina hydrate comprising pseudo-boehmite gel (Al- $_2O_3$: 37 wt %, ignition loss: 63 wt %) prepared by kneading amorphous alumina having a water content of 7% in a self-cleaning type kneader at about 90° C. for 3 minutes. The resultant mixture was fully kneaded, and the kneaded mixture was extruded by an extruder to prepare an extrudate having a diameter of 1.5 mm. The extrudate was dried and calcined in air at 350° C. for one hour and further at 600° C. for one hour.

In the preceding step, $NH_3$ amount of ammonia solution used for dissolving ammonium paramolybdenate is such an amount as that the molybdenum compound may form $(NH_4)_2MoO_4$. The extrudate contained 3.4 wt % of molybdenum and 1.5% of cobalt.

The above calcined extrudate was then subjected to an impregnation treatment with an ammonia solution containing molybdenum and cobalt in the following manner. 1000 g of the above calcined extrudate as impregnated with molybdenum and cobalt by being dipped in 1186 ml of a molybdenum-containing and cobalt-containing solution prepared by dissolving 189 g of ammonium molybdenate containing 56.5 wt % of molybdenum metal in 1000 ml of 13.5 wt % $NH_3$ solution and further dissolving 143 g of cobalt nitrate in the resultant solution with fully stirring. The impregnated extrudate was subjected to evaporation to dryness. The dried extrudate was calcined in air at 350° C. for one hour and further at 600° C. for one hour to obtain Catalyst A.

EXAMPLE 2

The same procedure as in Example 1 was repeated to prepare Catalyst B, except that an ammonium paramolybdenate solution to be used in the kneading step was prepared by dissolving 61 g of ammonium paramolybdenate in 162 g of water in place of 4.2 wt % $NH_3$ solution.

COMPARATIVE EXAMPLE 1330 g of commercially available powdery alpha-alumina monohydrate (pseudo-boehmite), 59 g of powdery ammonium molybdenate (56 wt % Mo), and 32 g of powdery cobalt carbonate were fully mixed in a mixer. The resultant powdery mixture was fully kneaded in a kneader while adding 852 g of 6 wt % $HNO_3$ solution. The kneaded product was then extruded by an extruder to prepare an extrudate having a diameter of 1.5 mm. The resultant extrudate was dried and calcined in air at 350° C. for 1 hour and further at 600° C. for 1 hour. The extrudate thus obtained contained 3.4 wt % of Mo and 1.5 wt % of Co.

The calcined extrudate was subjected to impregnation treatment with a molybdenum and cobalt-containing ammonium solution. The impregnation treatment was carried out in the same manner as in Example 1, thus obtaining Catalyst C.

Various properties of Catalysts A, B and C thus obtained are shown in the following Table 1.

TABLE 1

|  | Catalyst A | Catalyst B | Catalyst C |
|---|---|---|---|
| Apparent Bulk Density (g/ml) | 0.678 | 0.678 | 0.770 |
| Particle Size (mm) | 1.5 | 1.5 | 1.5 |
| Surface Area* | 248 | 248 | 250 |
| Co, (wt %) | 3.7 | 3.7 | 3.7 |
| Mo, (wt %) | 12.0 | 12.0 | 12.0 |
| Pore Volume** (cc/g) | 0.59 | 0.59 | 0.46 |
| Average Pore Size** (Å) | 107 | 107 | 91 |

*Measured by BET Method
**Measured by Mercury Injection Method

Hydrodesulfurization of hydrocarbon oil was carried out by using the above prepared Catalysts. The starting oil to be treated was a vacuum distillation oil containing 2.97 wt % of sulfur and having a boiling point range of 330° C.–572° C. The hydrodesulfurization was conducted in a vertical type tubular reactor at a temperature of 375° C. under a pressure of 42 kg/cm$^2$ and at a liquid hourly space velocity of 3.0 hr$^{-1}$. As this result, it was proved that the activities of Catalysts A and B prepared in Examples 1 and 2 of the present invention were higher than that of Comparative Catalyst C respectively by 10% and 15% (desulfurization ratio measured from the sulfur content of the product treated under the same reaction conditions). Both Catalysts A and B have an apparent specific gravity (density) of about 13.6% lower than Comparative Catalyst C. This is also one of the advantages of Catalysts A and B of the present invention over Comparative Catalyst C. That is, this means that, when an equal volume of catalyst is filled in a reactor, the weight of a catalyst having a lower apparent density is smaller in comparison with a catalyst having a higher apparent density. If the amount of catalyst metal to be supported on a carrier is equal, the amount of the catalyst metal to be used can spare depending on the catalyst weight.

Accordingly, the weight of each of Catalysts A and B having an apparent density of 0.678 g/ml is 13.6% smaller as compared with that of Catalyst C having an apparent density of 0.770 g/ml. Although used amounts of Catalysts A and B were less, their activities were respectively 10% and 15% higher in comparison with Catalyst C. Thus, the catalyst of the present invention provides double merits.

What we claim is:

1. A method for preparing a hydrodesulfurization catalyst which comprises:
   (a) preparing a filter cake of amorphous alumina hydrate having a pH of 7.5–10.5;
   (b) dewatering said filter cake by a filter press to raise the $Al_2O_3$ concentration to 28–35% by weight and kneading the dewatered filter cake for at least 10 seconds by a self-cleaning type kneader to obtain a dough;
   (c) adding to the dough obtained from the step (b), aqueous solutions of (i) water-soluble salts of Group VIB and (ii) at least one member selected from the catalyst metal group consisting of Fe, Co and Ni, respectively, in an amount of 20–60% by weight, calculated as the metals, of the total amount of catalyst metals to be incorporated in the catalyst, said aqueous solutions being added at a position just before the entrance of a kneader, kneading the resultant mixture and extruding the kneaded mixture by an extruder;
   (d) drying and calcining the extrudate; and
   (e) impregnating the calcined product with the remaining catalyst metals in an aqueous ammonia solution of salts of the metals and drying and calcining the resultant product.

2. A method according to claim 1, wherein said VIB Group metal is at least one member selected from the group consisting of Cr, Mo and W.

* * * * *